US012677234B2

(12) United States Patent
Pudney et al.

(10) Patent No.: US 12,677,234 B2
(45) Date of Patent: Jul. 7, 2026

(54) REGISTRATION REQUEST HANDLING IN A CELLULAR NETWORK

(71) Applicant: VODAFONE GROUP SERVICES LIMITED, Newbury (GB)

(72) Inventors: Christopher Pudney, London (GB); Yang Lu, London (GB)

(73) Assignee: VODAFONE GROUP SERVICES LIMITED, Newbury (GB)

( * ) Notice: Subject to any disclaimer, the term of this patent is extended or adjusted under 35 U.S.C. 154(b) by 758 days.

(21) Appl. No.: 17/817,614

(22) Filed: Aug. 4, 2022

(65) Prior Publication Data

US 2023/0045527 A1     Feb. 9, 2023

(51) Int. Cl.
| | |
|---|---|
| *H04W 60/00* | (2009.01) |
| *H04B 7/185* | (2006.01) |
| *H04W 16/24* | (2009.01) |
| *H04W 64/00* | (2009.01) |
| *H04W 84/04* | (2009.01) |

(52) U.S. Cl.
CPC ........ *H04W 60/00* (2013.01); *H04B 7/18545* (2013.01); *H04W 16/24* (2013.01); *H04W 64/00* (2013.01); *H04W 84/042* (2013.01)

(58) Field of Classification Search
None
See application file for complete search history.

(56) References Cited

U.S. PATENT DOCUMENTS

| | | | |
|---|---|---|---|
| 2018/0020417 A1 | 1/2018 | Catovic et al. | |
| 2019/0223246 A1 | 7/2019 | Chien-Chun | |
| 2020/0163042 A1* | 5/2020 | Cho .................... | H04W 64/006 |
| 2020/0187144 A1 | 6/2020 | Jiangwei | |
| 2021/0143900 A1 | 5/2021 | William | |
| 2021/0144539 A1 | 5/2021 | Edge et al. | |
| 2021/0144669 A1* | 5/2021 | Edge .................. | H04W 12/037 |
| 2021/0258857 A1* | 8/2021 | Won .................... | H04W 60/005 |
| 2021/0329539 A1* | 10/2021 | Surisetty .............. | H04W 48/16 |

FOREIGN PATENT DOCUMENTS

| | | |
|---|---|---|
| EP | 3905782 | 11/2021 |
| WO | 2019/166837 | 9/2019 |

OTHER PUBLICATIONS

ISR EP22188497 dated Dec. 9, 2022.
"UKIPO Combined Search and Examination Report for GB application 2111326.1," mailed Jan. 19, 2022.

* cited by examiner

*Primary Examiner* — Suhail Khan
(74) *Attorney, Agent, or Firm* — Workman Nydegger

(57) ABSTRACT

A request for registration by a User Equipment (UE) to a cellular network is handled. The geographical coverage of the cellular network is divided into a plurality of tracking areas, each tracking area having a respective identifier. A registration request message is communicated from the UE to the cellular network via an access node. Where the registration request is rejected, a registration rejection message is communicated in response. The registration request message and/or the registration rejection message includes the identifier for each of one or more tracking areas to which the respective message applies.

9 Claims, 5 Drawing Sheets

REGISTRATION REQUEST HANDLING IN A CELLULAR NETWORK

The present application is based on, and claims priority from GB Application Number 2111326.1, filed Aug. 5, 2021, the disclosure of which is hereby incorporated by reference herein in its entirety.

BACKGROUND

1. Technical Field

The present disclosure concerns handling a request for registration by a User Equipment (UE) to a cellular network, including methods for handling such requests and a UE and network configured to operate in accordance with those methods.

2. Related Art

Cellular wireless communication networks provide wide geographical coverage by allowing mobile terminals to access the network through a Radio Access Network (RAN) formed of cells, each cell having a specific geographical coverage area. In this context, a cell refers to a base station (RAN access node) having a cell identifier (Cell ID), for example as used in Third Generation Partnership Project (3GPP) standards. Coverage areas of cells may overlap and this may assist to avoid areas without coverage. Virtualization of cells may allow more flexible and lower cost deployment of cells. Nevertheless, there are still certain areas without cellular wireless network coverage, for example where the deployment of cells is hazardous, difficult, costly or a combination of these. This may particularly occur in rural areas and developing countries.

The use of a High Altitude Platform (HAP) or a satellite to provide cells, in particular using a 5G or Next Generation (NG) RAN, allows coverage on the ground as it would be by a typical Mobile Network Operator (MNO) site, allowing access by the same mobile terminals supporting this RAN in the terrestrial networks. Providing cells using Low or Medium Earth Orbit satellites is increasingly being considered. A RAN provided by a HAP or satellite infrastructure involves complexities, especially in providing coverage over much larger geographical areas than terrestrially based access nodes.

Referring first to FIG. 1, there is schematically shown an existing cell structure for a cellular network. In a typical network design, a group of cells are identified as a Tracking Area. A base station 10 (including a gNB of a 5G or NG RAN) broadcasts only a single Tracking Area Code (TAC) 20, which identifies the Tracking Area to which the radio cell belongs. User Equipment (UE) 30 in the cell receive the TAC. The Tracking Area Identity (TAI), as defined in 3GPP TS23.003, is the combination of the TAC and the identifier for the selected Public Land Mobile Network (PLMN ID). When a UE 30 initializes or moves locations, a Tracking Area Update (TAU) is performed. The Core Network is thereby informed of the location for the UE 30.

For a 5G or NR RAN using a satellite, the satellite radio cell may be termed a "moving on Earth cell". In this case, the base station may be permitted to broadcast more than one TAC (that is, a list of TACs) in the System Information Block (see, for example, "LS on multiple TACs per PLMN", 3GPP TSG RAN WG2 Meeting #113bis-e, R2-2104377). When the Radio Resource Control (RRC) layer of the UE reads the system information and obtains the list of TACs, the RRC layer of UE provides the list to the Non-Access Stratum (NAS) software of the UE.

Referring next to FIG. 2, there is illustrated an existing message flow for a registration procedure, for example in line with 3GPP TS23.502, section 4.2.2.2.2. To consider a simple example, the gNB 10 may broadcast a list of two TACs (labelled "TAC #1" and "TAC #2" for convenience). A situation may arise in which the UE was previously successfully registered in a different Tracking Area (labelled "TAI #3") that does not contain TAI #1 or TAI #2. The NAS 31 of the UE therefore considers TAI #3 as the last visited registered TAI. Then, the NAS 31 of the UE receives this list of two TACs from the RRC layer of the UE.

Since neither TAI #1 nor TAI #2 is within the registration area in which the UE was previously successfully registered, the NAS 31 performs a registration procedure 110 (location update), by instructing 120 the RRC layer 32 of the UE to send a REGISTRATION REQUEST message including TAI #3. The RRC layer 32 sends 130 the REGISTRATION REQUEST message including TAI #3 (and typically an identifier for the UE, for example the 3GPP Globally Unique Temporary Identifier, GUTI) via the gNB 10 to the Access and Mobility Function (AMF) 40. The gNB 10 encapsulates the received REGISTRATION REQUEST message 130 in a Next Generation Application Protocol (NGAP) message 140 sent to the AMF 40, adding a new TAI for the UE as an NGAP parameter within the NGAP message 140. The new TAI for the UE is decided by the gNB (for instance, based on an estimation of the position of the UE by the gNB) and is either TAM #1 or TAI #2 in this exemplary case.

A subscription check process 150 then takes place, in which the AMF 40 registers with a Unified Data Management (UDM) 50 by sending a Nudm_UECM_Registration message to the UDM 50. Once that check has been completed, a result is received at the AMF 40 from the UDM 50. Based on that result, the AMF 40 sends a REGISTRATION ACCEPT message or a REGISTRATION REJECT message in a NGAP message 160 to the gNB 10, depending on the check. The gNB 10 piggybacks the REGISTRATION ACCEPT message or REGISTRATION REJECT message in a RRC message 170 to the UE RRC layer 32. The UE RRC layer 32 then forwards 180 the REGISTRATION ACCEPT message or REGISTRATION REJECT message to the NAS layer 31 of the UE.

This procedure thereby allows the UE to register with a Tracking Area of the cellular network or if the procedure fails (for instance, because a REGISTRATION REJECT message is received), to reregister in a different Tracking Area of the cellular network. One reason for the UDM to reject the registration request is because the UE is located in one country, but is trying to access a PLMN having a coverage area for a different country. This issue has been considered in US 2021/143900 A1, US 2021/144539 A1 and US 2021/144669 A1, where it is suggested that, where RRC message 170 is a registration rejection message, this may include an indication of the country in which the UE is located or that the UE is not located in a country for the selected PLMN. The UE may therefore recognize that the rejection request applies to all Tracking Areas associated with that PLMN.

Situations may arise where the UE is rejected from one or more specific Tracking Areas of the PLMN, but not necessarily all Tracking Areas of the PLMN. Also, the UE may need to consider the situation where the cell broadcasts more than one Tracking Area. Improvement of the registration procedure is therefore desirable to handle a wider range of cases.

SUMMARY

Against this background, the present disclosure provides methods for handling a request for registration by a User Equipment (UE) to a cellular network, a network node of a cellular network, and a UE. Other preferred features are disclosed with reference to the claims and in the description below.

The disclosure has a number of related aspects, all of which concern the ability of the network to convey to the UE and/or for the UE to understand from the network, as to which Tracking Areas (according to their respective TAC or TAI) have been rejected by the network when making a registration request. In one aspect, the specific identifiers for the rejected Tracking Area or Tracking Areas are communicated from the network to the UE in a registration rejection message. In another aspect (and the two aspects may be combined), the UE indicates one or more Tracking Areas in which it wishes to register as part of the registration request message. Even if the network does not explicitly indicate the rejected Tracking Area or Tracking Areas in that case, the UE can infer that the rejected Tracking Area or Tracking Areas as those indicated in the registration request message.

This is based on the recognition that, when the UDM or AMF rejects the registration request from the UE (for example, because the UE is not permitted to receive service in the area where the UE is currently located), existing cellular network design assumes that the UE can always infer the rejected Tracking Area, because the cell is only transmitting a single TAC or TAI. However, this can especially cause issues when the cell transmits more than one TAC or TAI. In that case, the UE does not know which TAI has been used by the gNB, in sending the registration request on to the AMF. If the gNB broadcasts two TACs (for example, TAW and TAI #2, as in the example above), the UE will not know if the rejection request applies to both TACs or one TAC and if the latter, which one. According to the approach of the present disclosure, the UE will know the Tracking Area or Tracking Areas to which the rejection applies (for instance, which or both of TAW and TAI #2 are rejected). It can then identify which Tracking Area or Tracking Areas may be added into a forbidden TAI list and/or whether or not another Tracking Area update attempt is permitted or worthwhile.

Any of the methods disclosed herein may be performed by a computer program. A computer program comprising instructions which, when the program is executed by a processor, cause the processor to carry out any method disclosed herein may also be provided. Combinations of aspects or features between aspects may also be provided.

BRIEF DESCRIPTION OF THE DRAWINGS

Where a drawing indicates a feature also shown in another drawing, identical reference numerals have been used.

DESCRIPTION OF EXEMPLARY EMBODIMENTS

A number of message flows are now discussed, according to possible implementations according to the disclosure. The message flows are considered in relation to a 5G network architecture with a NR RAN, but it will be understood that the approach may be more widely applicable. For example, a more generic base station may be considered instead of a gNB and/or a different core network architecture may be employed.

In each of the exemplary message flows now considered, the simple example discussed above will again be used, in which the gNB 10 broadcasts a list of two TACs ("TAC #1" and "TAC #2"), but the UE was previously successfully registered in a different Tracking Area ("TAI #3") that does not contain TAI #1 or TAI #2. In each of the message flows, the NAS layer 31 of the UE therefore decides to initiate a registration procedure, causing the process to begin.

Figure 1:
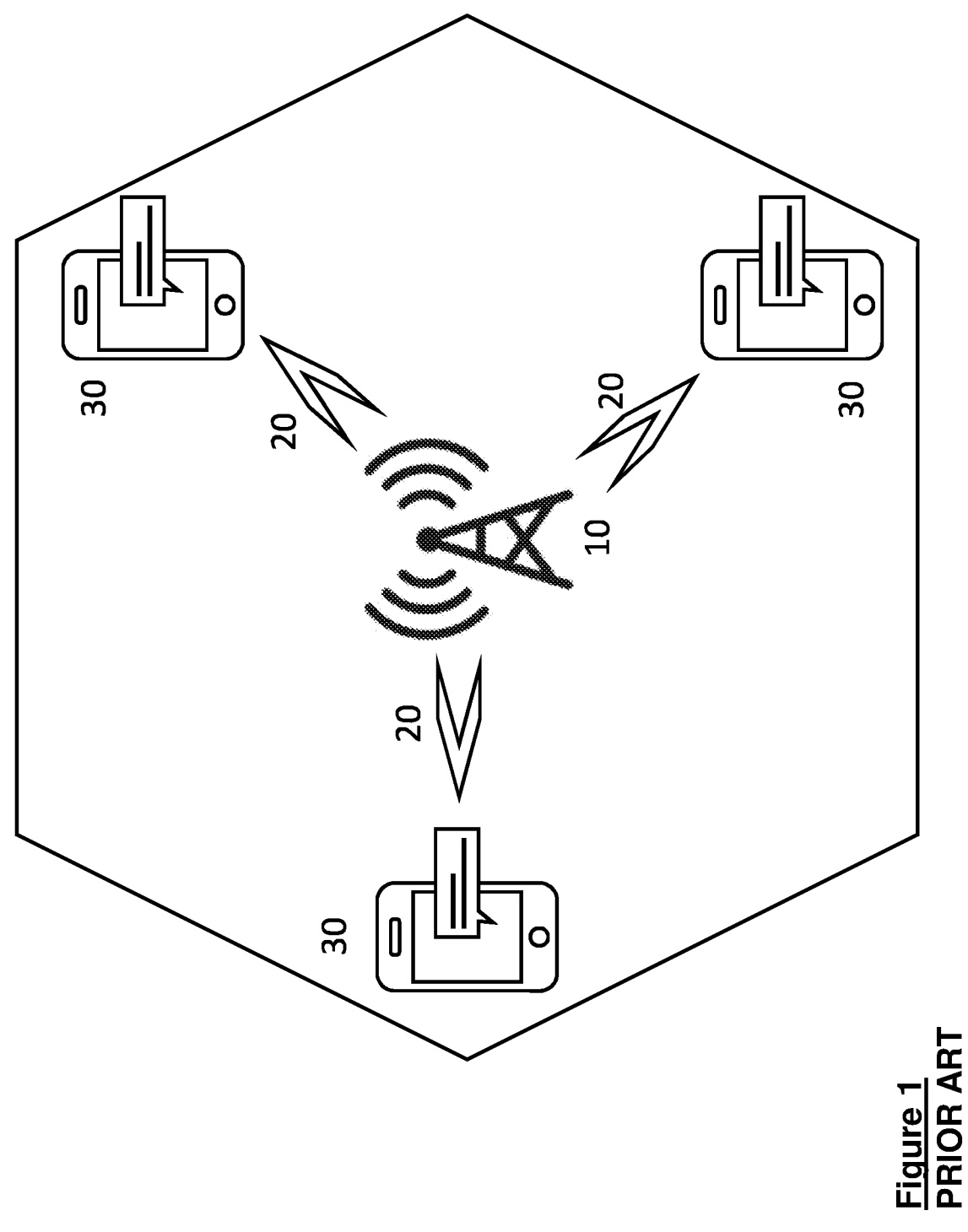
FIG. 1 schematically shows an existing cell structure for a cellular network.
Figure 2:
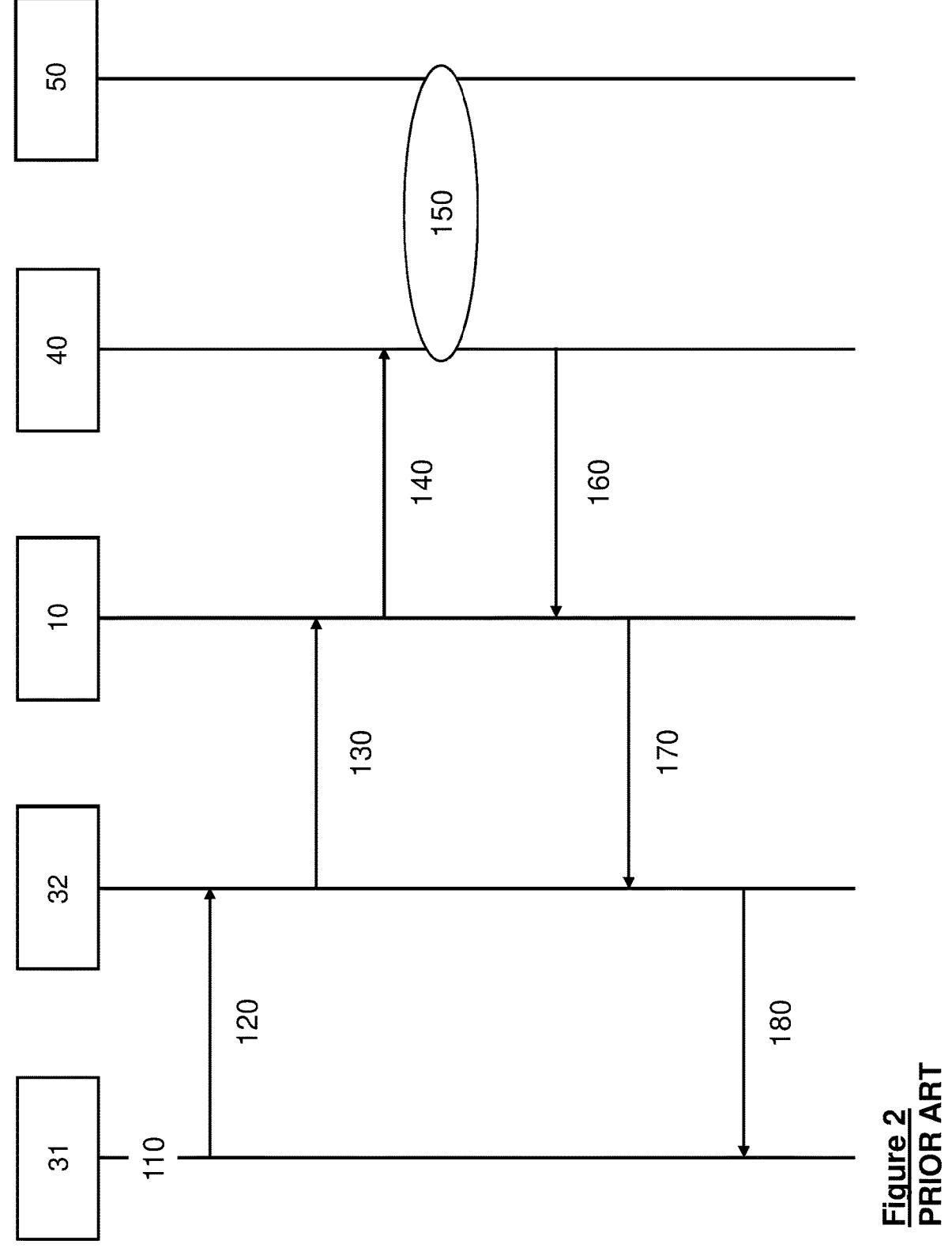
FIG. 2 illustrates an existing message flow for a registration procedure.
Figure 3:
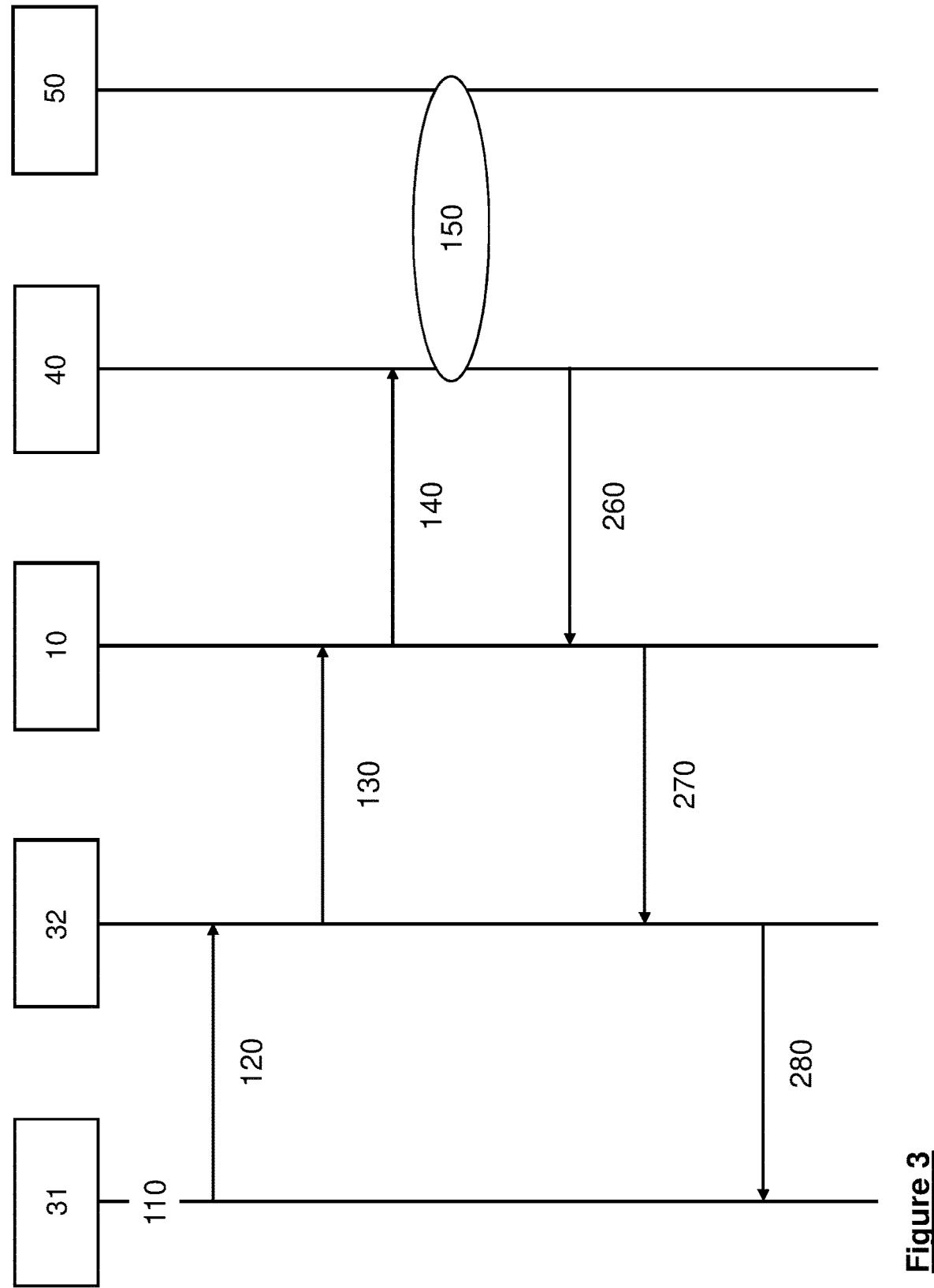
FIG. 3 illustrates a message flow for a registration procedure in accordance with a first implementation according to the disclosure.

Referring first to FIG. 3, there is illustrated a message flow for a registration procedure in accordance with a first implementation according to the disclosure. This is similar to the process shown in FIG. 2, with specific differences as now discussed below.

The NAS layer 31 begins a registration procedure 110, by instructing 120 the RRC layer 32 of the UE to send a REGISTRATION REQUEST message including TAI #3. The RRC layer 32 sends 130 the REGISTRATION REQUEST message including TAI #3 via the gNB 10 to the AMF 40. The gNB 10 encapsulates the received REGISTRATION REQUEST message 130 in a NGAP message 140 sent to the AMF 40, adding a new TAI for the UE as an NGAP parameter within the NGAP message 140 and is either TAI #1 or TAI #2 in this exemplary case.

A subscription check process 150 then takes place, as discussed with reference to FIG. 2 above. Where the UDM 50 does not allow the registration request, the AMF 40 sends a REGISTRATION REJECT message in a NGAP message 260 to the gNB 10. The REGISTRATION REJECT message in the NGAP message 260 includes the rejected TAI or a set of TAIs, from which the UE is disallowed to access. Optionally, the NGAP message 260 includes a corresponding rejection category. The gNB 10 piggybacks the REGISTRATION REJECT message in a RRC message 270 to the UE RRC layer 32, which again includes the rejected TAI or a set of TAIs (and optionally the rejection category). The UE RRC layer 32 then forwards 280 the REGISTRATION REJECT message to the NAS layer 31 of the UE, including the rejected TAI or a set of TAIs (and optionally the rejection category).

The rejected TAI or a set of TAIs indicated in the REGISTRATION REJECT message thereby allow the NAS layer 31 to determine which TAI or TAIs to add to a forbidden TAI list. Additionally or alternatively, the NAS layer 31 may determine whether to perform another Tracking Area update, for instance because the REGISTRATION REJECT message did not indicate that all of the TAIs broadcast by the cell would be rejected.

In general terms, there may be considered a method for handling a request for registration by a UE to a cellular network (which may be a single PLMN or more than one PLMN sharing RAN infrastructure), at a network node of the cellular network, the geographical coverage of the cellular network being divided into a plurality of tracking areas and each tracking area having a respective identifier. Then, the method comprises: receiving at the network node, a registration request message originating from the UE via an access node of the cellular network; and communicating by the network node, a registration rejection message that is in response to the registration request message, the registration rejection message including the identifier for each of one or more tracking areas to which the registration rejection message applies. This method may be especially relevant where the network node is the access node of the cellular network (for instance, a gNB) or a core network node of the cellular network (for example, a AMF). Where the term "communicating" (or "communicate") is used herein, particularly with reference to a description in general terms, this may be understood as meaning transmitting and/or receiving. For example, communicating the registration rejection message may include any one or more of: transmitting the registration rejection message from the core network, for example AMF; receiving the registration rejection message at the base station (in particular, from the core network); and transmitting the registration rejection message from the base station (especially to the UE). Receiving the registration request message and/or communicating the registration rejection message may use a Radio Resource Control (RRC) message (for example at the base station) or a Next Generation Application Protocol (NGAP) message (at the base station or core network), for example.

In another general sense (which may be combined with any other aspect as discussed herein), there may be considered a method for handling a request for registration by a UE to a cellular network, the geographical coverage of the cellular network being divided into a plurality of tracking areas, each tracking area having a respective identifier. Here, the method comprises: transmitting a registration request message from the UE to an access node of the cellular network; and receiving at the UE, a registration rejection message that is in response to the registration request message, the registration rejection message including the identifier for each of one or more tracking areas to which the registration rejection message applies. Thus, this method is advantageously implemented at a UE. The registration request message and/or the registration rejection message may be communicated using a Radio Resource Control (RRC) message, for example.

Further general senses according to the disclosure will be discussed below, together with optional and/or advantageous features that may be implemented in any one general sense or combination thereof. First, further specific example implementations will be described.

Figure 4:
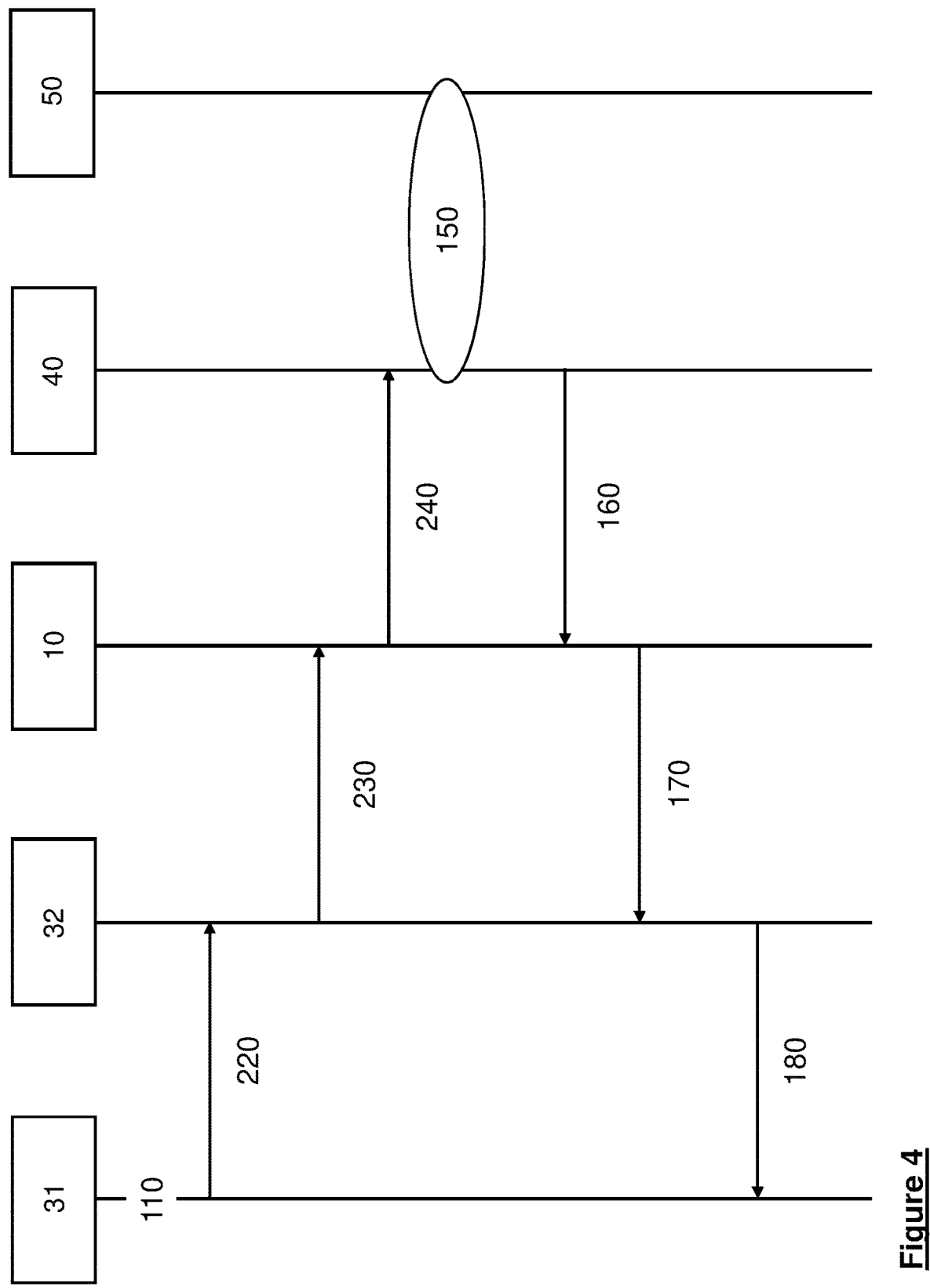
FIG. 4 illustrates a message flow for a registration procedure in accordance with a second implementation according to the disclosure.

Referring next to FIG. 4, there is illustrated a message flow for a registration procedure in accordance with a second implementation according to the disclosure. This is again similar to the process shown in FIG. 2, with specific differences as now discussed below.

The NAS layer 31 starts a registration procedure 110, by instructing 220 the RRC layer 32 of the UE to send a REGISTRATION REQUEST message including TAI #3 (as the last visited TAI), but also indicating one or more TAIs to which the request for registration should apply (for example TAI #2). The RRC layer 32 sends 230 the REGISTRATION REQUEST message including TAI #3 as last visited TAI and the one or more TAIs to which the request for registration applies (TAI #2) via the gNB 10 to the AMF 40. The gNB 10 encapsulates the received REGISTRATION REQUEST message 230 in a NGAP message 240 sent to the AMF 40, with the indicated one or more TAIs to which the request for registration is indicated to apply (TAI #2) added as an NGAP parameter within the NGAP message 240.

A subscription check process 150 then takes place, again as discussed with reference to FIG. 2 above. Where the UDM 50 does not allow the registration request for the indicated TAI (TAI #2), or the AMF 40 does not allow the registration request for the indicated TAI (TAI #2) based on a locally configured network operator policy, the AMF 40 sends a REGISTRATION REJECT message in a NGAP message 160 to the gNB 10. In this case, the REGISTRA-TION REJECT message in the NGAP message 160 does not include any list of the rejected TAI or TAIs, from which the UE is disallowed to access. In other words, the REGISTRA-TION REJECT message in the NGAP message 160 is essentially identical to the corresponding message of FIG. 2. The gNB 10 piggybacks the REGISTRATION REJECT message in a RRC message 170 to the UE RRC layer 32 and the UE RRC layer 32 forwards 180 the REGISTRATION REJECT message to the NAS layer 31 of the UE.

The UE is able to infer the rejected TAI or a set of TAIs as being those indicated in the REGISTRATION REQUEST message (in this example, TAI #2). If the UE had indicated a list of TAIs in the REGISTRATION REQUEST message and one of these had been acceptable, a REGISTRATION ACCEPT message would be have sent indicating the TAI for which the UE was accepted. The NAS layer 31 may thereby add the rejected TAI or TAIs to a forbidden TAI list and/or determine whether to perform another Tracking Area update.

Thus, an additional description in general terms may be considered. This provides a method for handling a request for registration by a UE to a cellular network, the geographical coverage of the cellular network being divided into a plurality of tracking areas, each tracking area having a respective identifier. The method comprises communicating a registration request message from the UE to an access node of the cellular network, the registration request message including the identifier for each of one or more tracking areas to which the registration request message applies. Again, the term "communicating" comprises transmitting and/or receiving and in the usage above may include one or both of: receiving the registration request message at the access node (for example, the base station or gNB); and transmitting the registration request message from the UE. Before considering additional general senses and optional and/or advantageous features that may be implemented in any one general sense or combination thereof, a further specific embodiment will be detailed.

Figure 5:
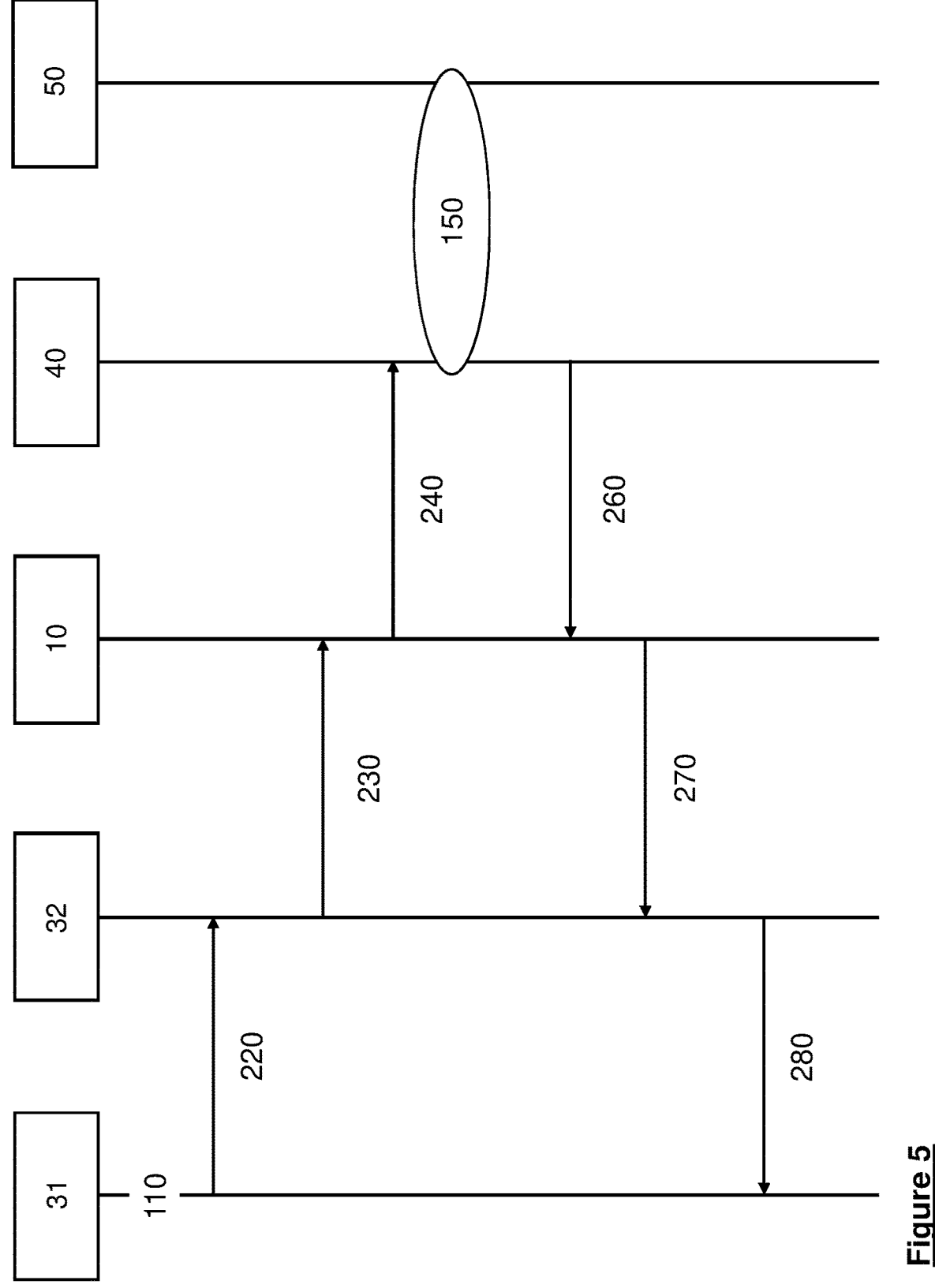
FIG. 5 illustrates a message flow for a registration procedure in accordance with a third implementation according to the disclosure.

Referring now to FIG. 5, there is illustrated a message flow for a registration procedure in accordance with a third implementation according to the disclosure. This is essentially a combination of the first implementation of FIG. 3 and the second implementation of FIG. 4, as now discussed below.

The NAS layer 31 starts a registration procedure 110, by instructing 220 the RRC layer 32 of the UE to send a REGISTRATION REQUEST message including TAI #3 (as the last visited TAI), but also indicating one or more TAIs to which the request for registration should apply (for example TAI #2). The RRC layer 32 sends 230 the REGISTRATION REQUEST message including TAI #3 as last visited TAI and the one or more TAIs to which the request for registration applies (TAI #2) via the gNB 10 to the AMF 40. The gNB 10 encapsulates the received REGISTRATION REQUEST message 230 in a NGAP message 240 sent to the AMF 40, with the indicated one or more TAIs to which the request for registration is indicated to apply (TAI #2) added as an NGAP parameter within the NGAP message 240.

A subscription check process 150 then takes place in the same way as previous explained. Where the UDM 50 does not allow the registration request for the indicated TAI (TAI #2), or the AMF 40 does not allow the registration request for the indicated TAI (TAI #2) based on a locally configured network operator policy, the AMF 40 sends a REGISTRA-TION REJECT message in a NGAP message 160 to the gNB 10. The REGISTRATION REJECT message in the NGAP message 260 includes the rejected TAI or a set of TAIs, from which the UE is disallowed to access. Optionally, the NGAP message 260 includes a corresponding rejection category. The gNB 10 piggybacks the REGISTRATION REJECT message in a RRC message 270 to the UE RRC layer 32, which again includes the rejected TAI or a set of TAIs (and optionally the rejection category). The UE RRC layer 32 then forwards 280 the REGISTRATION REJECT message to the NAS layer 31 of the UE, including the rejected TAI or a set of TAIs (and optionally the rejection category).

The rejected TAI or a set of TAIs indicated in the REGISTRATION REJECT message thereby allow the NAS layer 31 to determine which TAI or TAIs to add to a forbidden TAI list. Additionally or alternatively, the NAS layer 31 may determine whether to perform another Tracking Area update. For example, if the REGISTRATION REQUEST message indicates that the request applies to TAI #2 only, but the REGISTRATION REJECT message indicates that the rejection applies to both TAW and TAI #2, the UE may decide not to perform another Tracking Area update, because all TAIs broadcast by the cell would be rejected. Alternatively, if the REGISTRATION REQUEST message indicates that the request applies to TAI #2 only and the REGISTRATION REJECT message indicates that the rejection applies to TAI #2, the UE may decide to perform another Tracking Area update in respect of TAI #1.

According to a further general sense, there may be considered a method for handling a request for registration by a User Equipment (UE) to a cellular network, the geographical coverage of the cellular network being divided into a plurality of tracking areas, each tracking area having a respective identifier. The method comprises: communicating a registration request message from the UE to an access node of the cellular network, the registration request message including the identifier for each of one or more tracking areas to which the registration request message applies; and communicating a registration rejection message that is in response to the registration request message, the registration rejection message including the identifier for each of one or more tracking areas to which the registration rejection message applies. Note that, in line with the explanation above, "communicating" may mean one or both of transmitting and receiving. Thus, this method may be implemented at least at either the UE or the access node. The method (or indeed any method discussed herein) may be implemented at a system comprising more than one network node and/or a UE. As discussed above, each step of communicating the registration request message and/or the registration rejection message may use a Radio Resource Control (RRC) message or a Next Generation Application Protocol (NGAP) message, for example.

A number of optional and/or advantageous features may also be considered in respect of any aspect described herein. In particular, the access node advantageously allows access to the cellular network from more than one of the plurality of tracking areas. In this case, the access node may be configured to broadcast the respective identifier for each of the plurality of tracking areas from which access is allowed.

Optionally, the access node may allow access to more than one PLMN. For example, the access node may allow access to one or more tracking areas for a PLMN for one country and to one or more tracking areas for a PLMN for another country.

Beneficially, communication between the UE and the access node (also termed the air interface) is made via a High Altitude Platform (HAP) or satellite. This does not necessarily mean that the access node is located on the HAP or satellite, but rather than the antenna (which may include an antenna array) for the access node is located on the HAP or satellite, with the signal transmitted and/or received by that antenna being communicated from and/or to another station (for instance, a ground station), where the remainder of the access node arrangement is located.

Any of the methods described herein may be implemented as a computer program. The computer program may be configured to control a UE and/or a network node to perform any method according to the disclosure. A network node of a cellular network may also be provided, configured to operate in accordance with certain methods disclosed herein. For example, the network node may include a processor and at least one communication interface, particularly comprising one or both of a transmitter and receiver. A UE may also be provided, configured to operate in accordance with certain methods disclosed herein. The UE may likewise include a processor and at least one communication interface, particularly comprising one or both of a transmitter and receiver. The UE processor may be configured to have a RRC layer and/or a NAS layer. The RRC layer and NAS layer may communicate with each other, as disclosed herein.

Although specific embodiments have now been described, the skilled person will understand that various modifications and variations are possible. For example, whilst the disclosure is described in relation to existing network architecture, it will be understood that changes to the architecture (and/or nomenclature) are possible, but the present disclosure may still be applicable in this case. Also, combinations of any specific features shown with reference to one embodiment or with reference to multiple embodiments are also provided, even if that combination has not been explicitly detailed herein.

Another possible option may be considered, which may be especially useful where a cell broadcasts multiple TAIs in the same country and/or PLMN. In addition to a list of one or more rejected TAIs, the REGISTRATION REJECT message may include a geographic description to indicate locations from which access to one or more specific TAIs is not allowed. For instance, this may be defined by shape indicated by multiple points of latitude and longitude.

The REGISTRATION REQUEST message sent by the UE does not need to include the one or more TAIs to which it relates. The TAI or TAIs to which the message relates may be indicated by the context of the message or other factors or data within the message. Then, the inclusion of the one or more TAIs may be added by the network (typically in the RAN), for example by the gNB 10 when encapsulating the REGISTRATION REQUEST message 230 in a NGAP message 240, such that the one or more TAIs to which the request for registration is indicated to apply are simply added as an NGAP parameter within the NGAP message 240, as discussed above.

For an "Earth Moving Cell" covering multiple countries (that is, a different PLMN for each country), existing Network Sharing elements (described with reference to R15 NR RRC) allow the cell to have different TACs for each PLMN ID. In this situation, the UE may perform PLMN selection first and then may see just one TAC for that PLMN. However, physical movement of the UE from one country to another country may still require the UE to use GPS or GNSS to detect that it has changed country and then perform PLMN reselection.

In the general senses discussed above therefore, the registration rejection message may further include a geographic descriptor to indicate where the registration rejection message applies.

What is claimed is:

1. A method for handling a request for registration by a User Equipment (UE) to a cellular network, at a network node of the cellular network, the geographical coverage of the cellular network being divided into a plurality of tracking areas, each tracking area having a respective identifier, the method comprising:

receiving at the network node, a registration request message originating from the UE via an access node of the cellular network, the registration request message being a message for registering with a tracking area; and communicating by the network node, a registration rejection message that is in response to the registration request message, the registration rejection message including the identifier for each of one or more tracking areas to which the registration rejection message applies, wherein the registration request message indicates the identifier for each of one or more tracking areas to which the registration request message applies and/or the registration message includes the identifier for each of multiple tracking areas to which the registration rejection message applies.

2. The method of claim 1, wherein the network node is the access node of the cellular network or a core network node of the cellular network.

3. A non-transitory computer readable storage medium having stored thereon computer readable instructions that, when executed by a processor, cause the processor to perform the method of claim 1.

4. A network node of a cellular network, the geographical coverage of the cellular network being divided into a plurality of tracking areas and each tracking area having a respective identifier, the network node being configured to operate in accordance with the method of claim 1.

5. A method for handling a request for registration by a User Equipment (UE) to a cellular network, the geographical coverage of the cellular network being divided into a plurality of tracking areas, each tracking area having a respective identifier, the method comprising:

transmitting a registration request message from the UE to an access node of the cellular network, the registration request message being a message for registering with a tracking area; and receiving at the UE, a registration rejection message that is in response to the registration request message, the registration rejection message including the identifier for each of one or more tracking areas to which the registration rejection message applies, wherein the registration request message indicates the identifier for each of one or more tracking areas to which the registration request message applies and/or the registration message includes the identifier for each of multiple tracking areas to which the registration rejection message applies.

6. The method of claim 5, wherein the registration rejection message further includes a geographic descriptor to indicate where the registration rejection message applies.

7. The method of claim 5, wherein the access node allows access to the cellular network from more than one of the plurality of tracking areas.

8. The method of claim 5, wherein the access node allows access to more than one Public Land Mobile Network (PLMN).

9. The method of claim 5, wherein communication between the UE and the access node is made via a High Altitude Platform (HAP) or satellite.

* * * * *